United States Patent [19]

Negita et al.

[11] Patent Number: 4,563,692

[45] Date of Patent: Jan. 7, 1986

[54] HEAD AND RIBBON DRIVING MECHANISM FOR THERMAL PRINTER

[75] Inventors: Moriyasu Negita; Masao Fukai; Masatoshi Tokoro, all of Suzaka, Japan

[73] Assignee: Fujitsu Limited, Kawasaki, Japan

[21] Appl. No.: 711,636

[22] Filed: Mar. 14, 1985

[30] Foreign Application Priority Data

Mar. 19, 1984 [JP] Japan .................................. 59-53224

[51] Int. Cl.[4] .............................................. G01D 15/10

[52] U.S. Cl. ................................ 346/76 PH; 400/120; 400/356; 400/236

[58] Field of Search ................ 346/76 PH, 76 R, 105; 400/228, 229, 236, 236.2, 356; 219/216 PH; 242/129.7, 129.71, 129.72, 46, 46.4; 250/317.1, 319

[56] References Cited

U.S. PATENT DOCUMENTS

| | | | |
|---|---|---|---|
| 4,350,987 | 9/1982 | Hanagata et al. | 346/76 PH |
| 4,387,380 | 6/1983 | Asakura et al. | 346/76 PH |
| 4,453,167 | 6/1984 | Motoyoshi | 400/120 |
| 4,468,139 | 8/1984 | Hattori | 400/120 |
| 4,516,137 | 5/1985 | Yasui | 346/76 PH |

*Primary Examiner*—E. A. Goldberg
*Assistant Examiner*—A. Evans
*Attorney, Agent, or Firm*—Staas & Halsey

[57] ABSTRACT

A head-driving and ink ribbon feeding mechanism for an ink-transfer thermal printer comprises a print carriage mounted for parallel and non-rotational movement in a direction parallel to the platen of the printer. A support element carrying a thermal print head at a free end thereof is pivotally mounted on the carriage and is normally resiliently biased to press the thermal print head against the platen in a head-down position. Mechanical actuating means are switched selectively between a first position for advancing a thermo-ink ribbon in a cartridge received on said carriage past the thermal print head in the head-down position and to a second position in which the drive for the ribbon is disengaged and in which the elongated support element is engaged and pivoted to switch the thermal print head to a head-up position.

7 Claims, 13 Drawing Figures

HEAD AND RIBBON DRIVING MECHANISM FOR THERMAL PRINTER

BACKGROUND OF THE INVENTION

The present invention relates to an ink-transfer thermal printer, and, more particularly, to an improved head driving and ink ribbon feeding mechanism for an ink-transfer thermal printer.

The use of non-impact printers as medium and low speed printer output terminals of electronic business machines in business offices is becoming increasing prevalent, a large factor of their appeal being the silent printing operation afforded thereby, particularly in comparison with conventional impact printers. At present, ink-jet printers and thermal printers comprise the two major types of such non-impact printers.

As is well known, ink-jet printing is performed by ejecting micro-ink drops from micro-nozzles of an ink-jet head toward the recording paper; the micro-nozzles of ink-jet printers, however, are known to present maintenance problems.

Thermal printers, utilizing thermal energy as the basic printing method or technique, avoid the maintenance problem of ink-jet printers but introduce yet other problems. In this regard, there are two basic categories of thermal printing techniques.

The first thermal printing technique is known as thermal-sensitive printing, and employs a thermographic paper coated with a thermo-sensitive coating which, when heated above some predetermined minimum temperature, undergoes a color change. The thermographic paper employed in such thermo-sensing printing, however, is rather costly and the printed images tend to fade or become discolored over time.

A second category of thermal printing is known as ink-transfer thermal printing, wherein a thermo-ink, coated as a layer on a base ribbon of plastic film, is transferred selectively to the recording paper in accordance with the images or characters to be reproduced. The thermo-ink is solid at room temperature, but changes rapidly to a softened or molten state above a predetermined temperature. A thermal head, which may be of a dot matrix variety, is rapidly heated and caused selectively to contact the thermal-ink ribbon against the recording paper at a predetermined pressure, such that the selectively heated printing elements arranged on the thermal head cause the corresponding, contacted areas of the thermo-ink to become softened or molten and to selectively transfer from the ribbon to the recording paper as spots, or dots, of the thermo-ink material, the transferred dots providing a durable printed image on the recording paper. The thermo-ink is usually a carbon black powder or pigments which are mixed with a binder such as wax. As is readily apparent, the thermo-ink ribbon can be used only once in a given area, because the selective transfer of dots of the thermo-ink to the recording paper necessarily leaves the corresponding portions of the base ribbon exposed, or depleted of further thermo-ink material. Since it is somewhat expensive, the thermo-ink ribbon should be used as efficiently as possible; particularly, and by way of example, during spacing operations in which no printing is performed, the thermo-ink ribbon should not be fed or advanced, since otherwise the advanced portion of the thermo-ink ribbon is needlessly consumed and thus wasted. Accordingly, it is important that a thermo-ink ribbon feeding mechanism be designed to be coordinated with the movement of the thermal head and the circumstance of whether printing is or is not to be performed at any given position in which the print carriage is moved; particularly, the ribbon should be advanced by the required pitch (i.e., of the next print function, whether a full character or a column of selected dot positions) when printing is to be performed, and alternatively it should not be advanced when no printing is to be performed (i.e., as in a spacing operation).

Mechanisms have been proposed in the prior art for the purpose of achieving this efficient use of the thermo-ink ribbon and particularly to avoid advancing same during carriage movement for a spacing operation in which no printing is to be performed. FIG. 1 is a schematic, perspective view of such a prior art ink-transfer type thermal printer, FIG. 2 comprising a cross-sectional elevational view of the thermal printer of FIG. 1 illustrating the printer carriage mechanism and associated elements. With concurrent reference to FIGS. 1 and 2, recording paper 7 is wrapped partially about a cylindrical platen 6 and advanced thereby to receive successive lines of print, as desired, along the horizontal, printing direction illustrated by the line x—x in FIG. 1, the line x—x extending generally parallel to the axis of the cylindrical platen 6.

In typical operation, following printing on a given print line, the recording paper 7 is advanced in the direction of the arrow a by a corresponding, intermittent rotation of the platen 6; typically, guide means (not shown) are provided to guide the paper 7 during this advancing operation. A carriage 5 is mounted in sliding engagement on a main guide bar 8 for selective translational movement therealong, in the alternative or opposite directions shown by the arrows b and c, parallel to the axis of the platen and thus to the printing direction x—x. Carriage 5 is driven by a carriage feeding means, typically comprising driving cables with related pulleys and a driving motor (not shown), for the selective translational or sliding movement along main guide bar 8. Carriage 5, moreover, is selectively rotatable about the main guide bar 8 in the alternative or opposite direction shown by the arcuate arrows f and g.

A thermo-ink ribbon 1 extends from a supply spool thereof (not shown) across the face of the cartridge 3, such that a length of the ribbon 1 is disposed adjacent the current print line x—x on the recording paper 7, and is advanced onto a take-up reel 2 which, as seen in FIG. 2, is received over and driven by a shaft 9. Shaft 9 is mounted on the carriage 5 for rotary motion and extends downwardly therefrom, carrying at its lower end a roller 10 affixed thereto for rotatably driving the shaft 9.

Carriage 5 supports a thermal head 4 which may be of conventional type, the ribbon 1, as best seen in FIG. 2, being interposed between the thermal head 4 and the recording paper 7 which in turn is wrapped about the platen 6.

A head driving mechanism for the carriage 5 comprises an electromagnetic solenoid 11 and associated plunger or spindle 13, a horizontal bar 12 coextensive with and extending parallel to the main guide bar 8, and the aforenoted take-up spool drive shaft 9 and associated roller 10. The horizontal bar 12 is mounted for generally horizontal, reciprocating movement selectively in the opposite directions indicated by the double-head arrow e in FIG. 2. Particularly, the bar 12 is to be driven to the right (i.e., as seen in FIG. 2) by the spindle 13 of the solenoid 11 when the latter is energized, to rotate the carriage to the so-called "head-down" position in which the thermal head 4 selectively engages the ribbon 1 against the recording paper 7 to perform a printing operation; conversely, spring means (not shown) normally bias the carriage 5 to rotate in the direction of arrow g, returning same to the so-called head-up position when the solenoid 11 is not energized.

More specifically, when the solenoid 11 is energized, the spindle 13 pushes the horizontal bar 12 in a rightward direction as seen in FIG. 2, transversely to the axis of the platen 6, which operates in turn through the roller 10 and shaft 9 to rotate the carriage 5 in the direction of the arrow f shown in FIG. 2, and thus counterclockwise about the main guide bar 8, thereby rotating the thermal head 4 toward the thermo-ink ribbon 1 and the recording paper 7. The thermal head 4 thus engages the thermo-ink ribbon 1 and the recording paper 7 against the platen 6 with a predetermined pressure. This rotaty motion of the thermal head 4 in the direction f is referred to as a "head-down" operation.

In known manner, thermal printing elements (not shown) are arranged on the face of the thermal head 4 in a vertical line, perpendicular to the print line x—x. When the thermal head 4 is pressed against the thermo-ink ribbon 1 and the appropriate printing elements are selectively heated by their respective heaters, the corresponding, softened or molten portions of the thermo-ink layer are transferred to the recording paper 7, leaving a dot pattern thereon. Thereafter, the heaters for the selective elements are turned off. The roller 10 is engaged with the guide bar 12 and the carriage 5 is advanced in translational movement along the main guide bar 8 in the direction of the arrow b, thereby rotating the roller 10 in the direction of the arrow d as a result of the frictional engagement of the roller 10 with the horizontal bar 12. This in turn rotates the shaft 9 of the take-up reel 2 mounted within the cartridge 3, advancing the thermo-ink ribbon 1 and winding up the used thermo-ink ribbon 1 onto the take-up spool 2. Thus, a fresh portion of the thermo-ink ribbon 1 is positioned in front of the thermal head 4, in preparation for the next printing operation.

When a space is designated in a line of print, the solenoid 11 is de-energized and simultaneously the plunger 13 and the horizontal bar 12 are withdrawn by spring means (not shown), thus disengaging bar 12 from the roller 10. Particularly, the carriage 5 is rotated about the main guide bar 8 in the direction of the arrow g (i.e., clockwise in FIG. 2) by springs (not shown) to the "head-up" position illustrated in FIG. 2. In the "head-up" position, the thermal head 4 is spaced apart from the thermo-ink ribbon 1; moreover, since the bar 12 is spaced from the roller 10 of the shaft 9, the take-up reel 2 is not driven and thus the thermo-ink ribbon 1 is not advanced during subsequent translation of the carriage 5 along the main guide bar 8, thus completing a space operation. Since the thermo-ink ribbon 1 is not advanced during the space operation, improved economy is achieved since the expensive thermo-ink ribbon 1 is not wasted by being advanced during the space operation, thus decreasing the operating costs of the thermal printer.

The prior art mechanism for an ink-transfer thermal printer head, as illustrated in FIGS. 1 and 2 and described above, will be seen to perform a mechanical switching operation, for moving the thermal head 4 between the head-down and head-up states or positions. The mechanism is of substantial mass and includes the entirety of the printing carriage 5, a thermo-ink ribbon cartridge including the ribbon and its supply and take-up spools, and the shaft 9 and roller 10 for driving the latter; likewise, the lengthy horizontal bar 12 must be moved for each switching operation. In view of the mass of these moveable members, it is difficult for such prior art mechanisms to perform the above-described mechanical switching operations rapidly, thus limiting the printing speed of the printer. Moreover, the electromagnetic solenoid operation and the related mechanical engaging functions involving the horizontal bar 12 produce substantial operating noise, detracting from the advantage of the "silent" printing operation of the thermal printer itself.

Various other carriage drive and thermo-ink ribbon winding mechanisms are known for thermal head printers. One such prior mechanism, disclosed in Japanese Laid-Open Patent Application TOKU-KAI-SHO No. 57-92180, published June 7, 1982, employs a small rocking arm which is mounted pivotally on the carriage and carries the thermal head on a free end thereof. As in the above described prior art structures, the carriage is mounted for sliding, translational movement along a guiding means, parallel to the platen. However, the carriage is not actuated in rotary fashion as aforedescribed, and instead it remains stable and only the rocking arm and thermal head are moved during printing operations. By thus minimizing the mass of the moveable elements, rapid head-down and head-up switching operations are possible permitting high-speed printing operations. Whereas high speed operation is obtained with this mechanism, the feeding of the thermo-ink ribbon and the transportation of the thermo-head cartridge are controlled independently, resulting in a somewhat complicated mechanism which also is costly to produce.

SUMMARY OF THE INVENTION

Accordingly, an object of the present invention is to provide a head driving and ink ribbon feeding mechanism for an ink-transfer thermal printer which is compact in size and affords higher speed printing operations at reduced noise levels, relative to prior art such mechanisms.

A further object of the present invention is to provide a head driving and ink ribbon feeding mechanism for an ink-transfer thermal printer having improved switching rates, or speeds, between head-up and head-down positions and which generates a reduced level of mechanical operating noise in performing those operations, relative to prior art such mechanisms.

Another object of the present invention is to provide a head driving and ink ribbon feed mechanism for an ink-transfer thermal printer employing mechanical switching means for switching the thermal print head between head-up and head-down positions and, automatically and substantially simultaneously, actuating the feed of the thermo-ink ribbon in the head-down position of the thermal print head for successive print operations and deactivating the feed of the thermo-ink ribbon in the head-up position of the thermal head during spacing and other operations in printing is not performed, thereby to avoid unnecessary advancing and thus waste of the unused thermo-ink ribbon.

The mechanism of the present invention overcomes the problems of the prior art mechanisms as above described, in two significant respects. The first is that the mechanism of the invention comprises mechanical switching means which employ a substantially reduced number of elements of minimum size, relative to prior art such mechanisms, for switching the thermal print head between the head-up and head-down positions, thus minimizing the mass of the moveable elements and permitting substantially increased rates of switching operations thereof with corresponding increased printing rates. A supporting lever of small mass is pivotally mounted to the print cartridge and carries the thermal head at a free end thereof. Resilient biasing means, such as springs, normally maintain the head-down state of the thermal head. Mechanical switching, or actuating, means are provided which selectively engage the opposite end of the supporting lever to cause pivotal movement thereof relative to the carriage, against the biasing force of the springs, to switch the head to the head-up state. By appropriate selection of the pivotal support position of the supporting lever, the inertia about the pivot position is minimal; as a result, the mechanism of the invention is capable of achieving rapid switching of the thermal head between the head-up and head-down positions. This contributes significantly to achieving high printing speeds in a thermal printer.

The second significant improvement relates to minimizing the noise caused by the switching operation. In the prior art mechanism described above, the switching operation is performed by an electro-magnetic solenoid which produces significant noise each time the plunger impacts the bar. This problem is avoided in accordance with the invention, through use of a cam mechanism instead of the prior art solenoid mechanism. The cam mechanism produces an essentially insignificant noise level during its operation.

These and other objects and advantages of the invention are more readily apparent from the following detailed description of the invention and the accompanying drawings, wherein like reference numerals refer to like parts.

BRIEF DESCRIPTION OF THE DRAWINGS

FIGS. 5 to 9 are detailed illustrations of an actual thermal printer according to the present invention, and wherein:

FIG. 5 is a general plan view of the thermal printer;

FIGS. 6(*a*) and 6(*b*) are cross-sectional views of the thermal printer of FIG. 5, respectively illustrating the head-down state and the head-up state thereof;

FIG. 7 is a perspective view of a U-shaped bar 125 pivotally mounted on a main guide bar 108, as are incorporated in the structure of FIGS. 5, 6(*a*) and 6(*b*);

FIGS. 8(*a*) and 8(*b*) are respectively a plan view and a cross-sectional view of a cam mechanism employed in conjunction with the U-shaped bar 125 of FIG. 7, as positioned for actuating the head mechanism to a head-down state; and FIGS. 9(*a*) and 9(*b*) are respectively a plan view and a cross-sectional view of the cam mechanism of FIGS. 8(*a*) and 8(*b*), as positioned for actuating the head mechanism to a head-up state.

DESCRIPTION OF THE PREFERRED EMBODIMENTS

Figure 3:
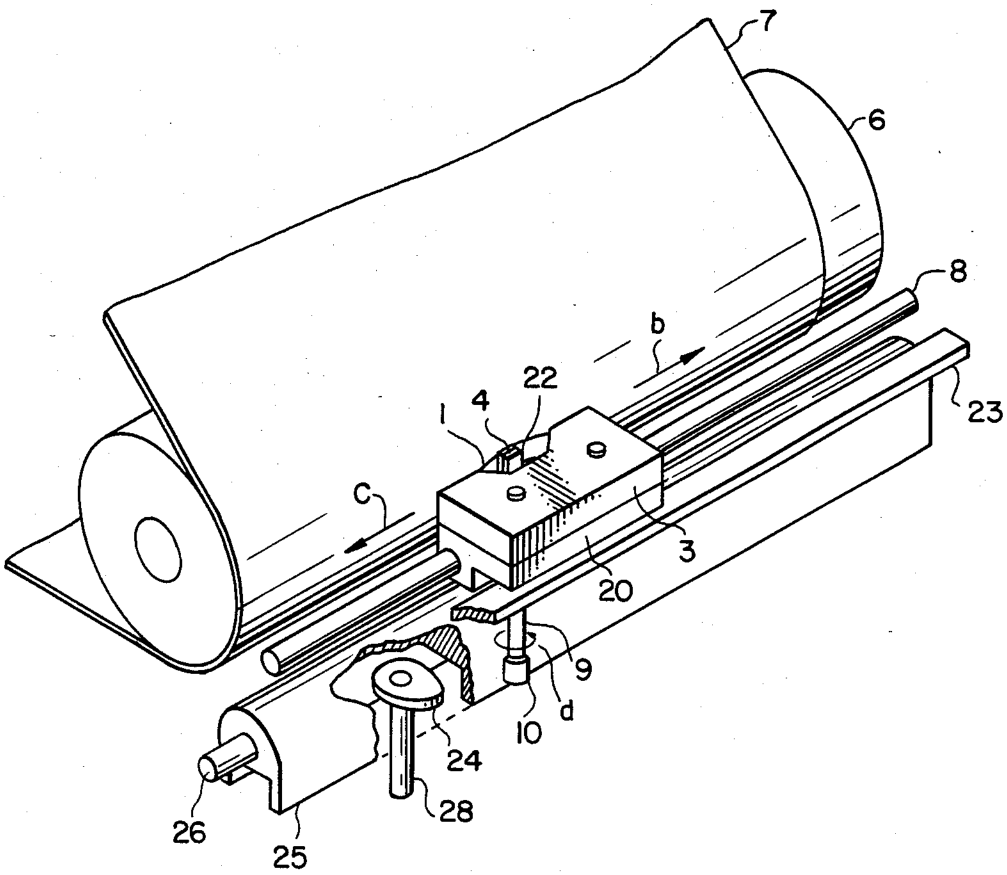
FIG. 3 is a schematic, perspective view of an ink-transfer thermal printer in accordance with the present invention.
Figure 4A:
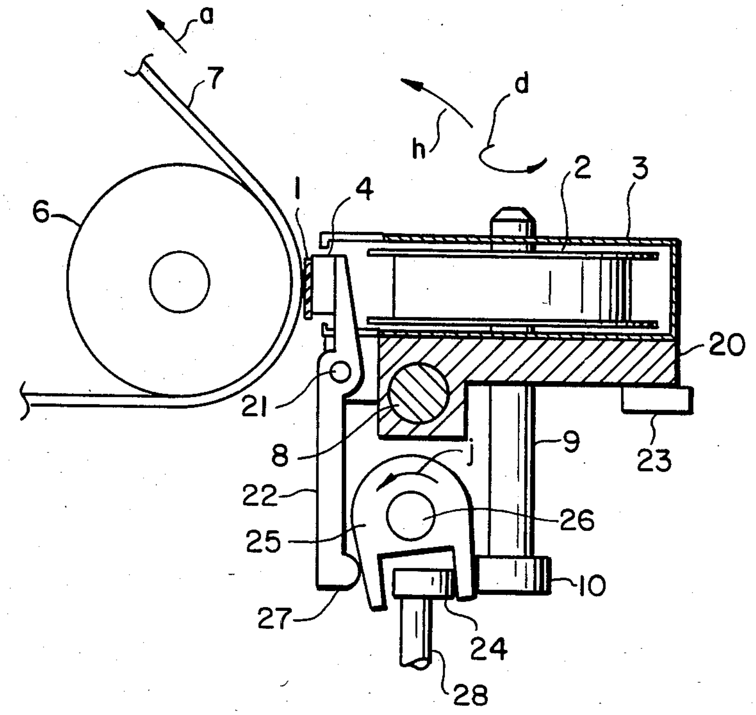
FIGS. 4(*a*) and 4(*b*) are cross-sectional views of the thermal printer of FIG. 3, illustrating the thermal head carriage and associated structures in a head-down state and in a head-up state, respectively.
Figure 4B:
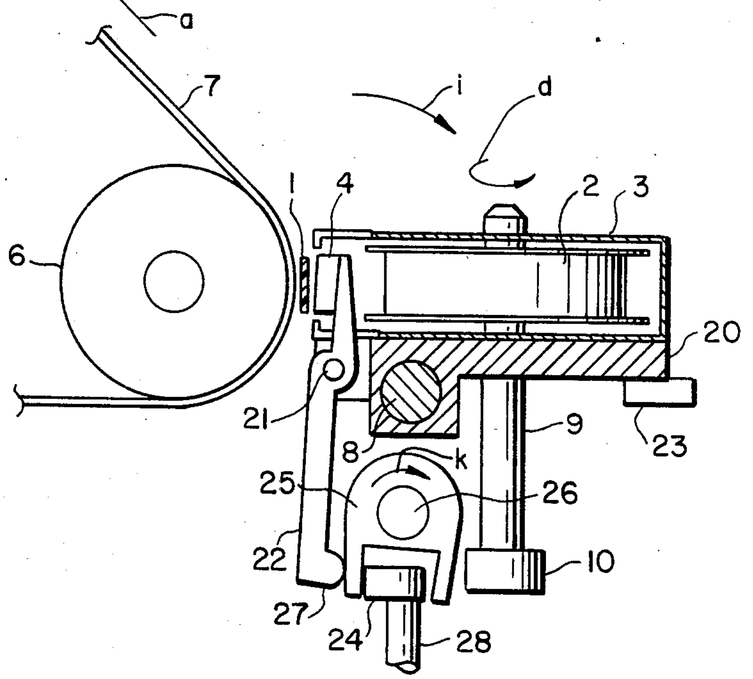

FIG. 3 is a schematic perspective view of an embodiment of an ink-transfer thermal printer according to the present invention, illustrating the structure of the head driving and ink ribbon feed mechanism thereof. FIGS. 4(*a*) and 4(*b*) are cross-sectional views of the embodiment of FIG. 3, illustrating the thermal head and its associated mechanism when actuated to a head-down state and to a head-up state, respectively. In each of FIGS. 1 to 4, like reference numerals refer to like parts.

Figure 1:
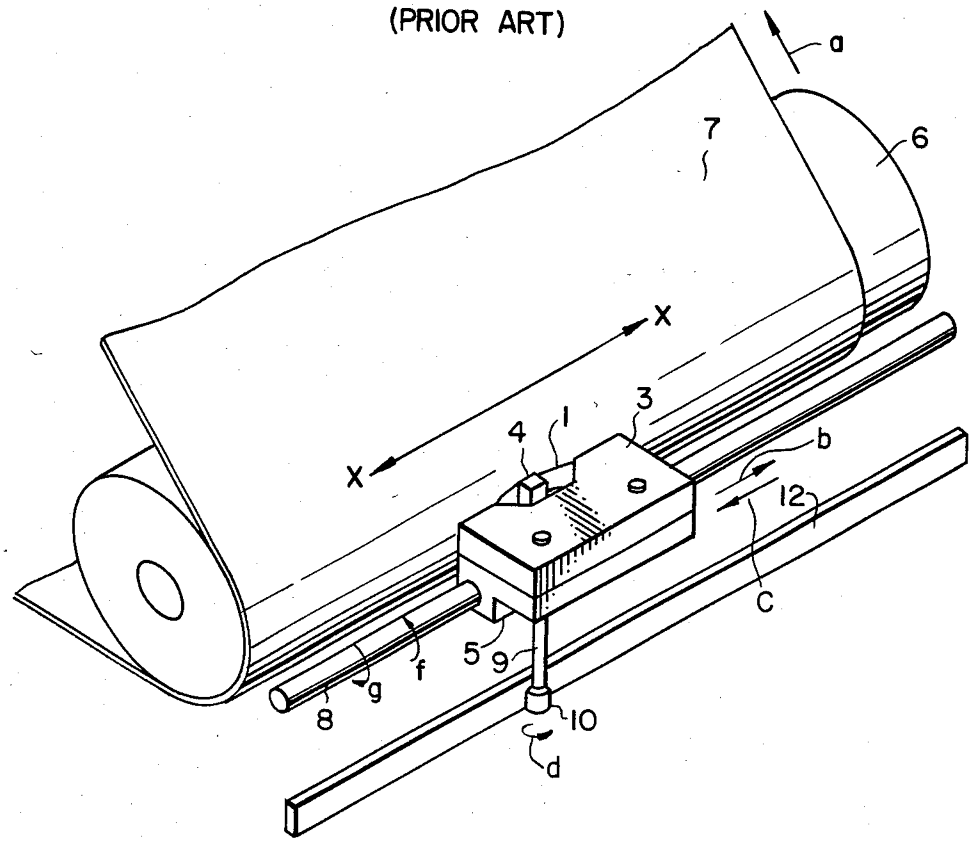
FIG. 1. (PRIOR ART)
FIG. 1 is a schematic, perspective view of a prior art ink-transfer thermal printer.
Figure 2:
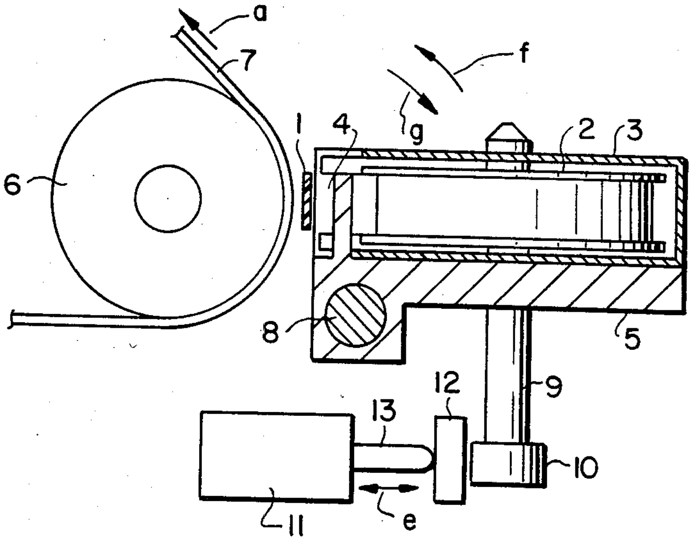
FIG. 2. (PRIOR ART)
FIG. 2 is a cross-sectional view of the prior art ink-transfer thermal printer of FIG. 1, illustrating the structure of the thermal head carriage and associated parts of the thermal printer.

A recording paper 7 is fed in the direction of the arrow a about a cylindrical platen 6, perpendicularly to the line of printing x—x (as illustrated in FIG. 1), which may be driven by a feed mechanism (not shown) in conventional fashion for advancing the paper 7 to successive print line positions.

A print carriage 20 is mounted on a main guide bar 8 for translational, sliding movement selectively in the directions of the arrows b and c, and thus parallel to the axis of cylindrical platen 6 and transversely to the direction a of movement of the recording paper 7. The carriage 20 is affixed in sliding engagement with a clamping guide bar 23 for free translational movement therealong, the bar 23 preventing rotational movement of the printing carriage 20 relative to the axis of the main guide bar 8. The printing carriage may be driven in the aforesaid translational movement by a conventional driving mechanism (not shown).

The frame of the printing carriage 20 supports a thermal print head 4 mounted on a supporting lever 22, and a cartridge 3 containing a supply spool (not shown) and a take-up spool 2 for a thermo-ink ribbon 1, a cross-sectional segment of which ribbon 1 is seen disposed between the thermal print head 4 and the recording paper 7. The supporting lever 22 is pivotally mounted on the printing carriage 20 by a pivot pin 21 which permits pivotal movement of the lever 22 selectively in the directions indicated by the arrows h and i as shown respectively in FIGS. 4(*a*) and 4(*b*), and thus in a plane perpendicular to the axis of the platen 6. The thermal head 4 is mounted at the upper, free end of the supporting lever 22 as seen in FIGS. 4(*a*) and 4(*b*), so as to engage the thermo-ink ribbon 1 against the recording paper 7 and platen 6 in the head-down position shown in FIG. 4(*a*). The opposite, or lower, free end of the supporting lever 22 includes a rounded projection 27 for contacting the adjacent, outer sidewall of the elongated, U-shaped lever 25.

The supporting lever 22 is biased normally by coil springs (not shown) to rotate in the direction of the arrow h shown in FIG. 4(*a*) and thus to maintain the head-down state. The thermal head 4 thus normally engages the thermo-ink ribbon 1 against the recording paper 7 and the platen 6 with a predetermined pressure established by the springs (not shown).

The ribbon cartridge 3 may be of a conventional prior art type, as previously described, and thus accommodates the thermo-ink ribbon 1, a supply spool (not shown in FIG. 4(*a*)) and a take-up spool 2, the latter receiving the upper extremity of a drive shaft 9 which is rotatably mounted in the carriage 20. The thermo-ink ribbon 1 is drawn from the supply spool and wound onto the take-up spool 2 when the latter is driven in rotation by the shaft 9 in the direction of the arrow d shown in FIGS. 4(*a*) and 4(*b*). The shaft 9 extends downwardly from the carriage 5 and carries a contact roller 10 at its lower end.

The head driving mechanism, or switching mechanism, which provides for actuation of the thermal head between its up and down positions, comprises the roller 10, the U-shaped bar 25, and a cam 24. More particularly, the longitudinal, U-shaped bar 25 is of a length corresponding to the required length travel of the printing carriage 20 and extends in a direction parallel to the axis of the platen 6; it is mounted to the printer frame by the axially extending pivot elements 26, which permit it to perform a reciprocal rotary, or rocking, movement, in the directions indicated by the arrows j and k in FIGS. 4(*a*) and 4(*b*). As is clearly seen in FIGS. 4(*a*) and 4(*b*), the U-shaped bar is mounted such that its interior recess, defined by the sidewalls of its U-shaped cross-sectional configuration, is inverted and thus extends downwardly relative to the pivot elements 26. A cam 24 mounted on a rotary shaft 28 is received in the U-shaped recess of the bar 25 and is selectively rotatable therewithin to engage one or the other of the interior sidewall surfaces 25*a* and 25*b*, the bar 25 thus acting as a cam follower with respect to the cam 24. Drive means (not shown) rotate the shaft 28 which in turn drives the cam 24 to the appropriate position in response to a drive signal, in accordance with whether a printing or a spacing operation is to be performed at any given position of the carriage 20. Thus, as shown in FIG. 4(*a*), when the cam 24 is rotated to engage the interior surface of the sidewall 25*b*, the U-shaped bar 25 is rotated in the direction of the arrow j. The spring biasing means (not shown) thus rotates lever 22 to position the thermal print head 4 in the head-down position, the projection 27 at the opposite, lower end of the lever 22 thus following the movement of the sidewall 25*a*. Simultaneously, the outer surface of the opposite sidewall 25*b* of the U-shaped bar 25 engages the roller 10. Thus, when the printing carriage 20 is driven in translation in the direction of the arrow b as shown in FIG. 3, by an incremental distance corresponding to one pitch of the dot print format, the roller 10 is rotated in the direction of the arrow d shown in FIG. 4(*a*) by frictional engagement of the roller 10 and the outer surface of the sidewall 25*b* of the U-shaped bar 25. Shaft 9 thus is rotated and advances the thermo-ink ribbon 1 onto the take-up spool 2, thus presenting a fresh portion of the thermo-ink ribbon 1 between the thermal head 4 and the recording paper 7 in preparation for the next printing operation.

Conversely, as shown in FIG. 4(*b*), when the shaft 28 is rotated to position the cam 24 at its opposite extreme, the U-shaped bar 25 is rotated in the direction of the arrow k, the outer surface of sidewall 25 engaging the rounded projection 27 of the supporting lever 22 for rotating the latter against the spring biasing force and switching the thermal head 4 to the head-up position. Simultaneously, the outer surface of the opposite sidewall 25*b* of the U-shaped bar 25 is displaced from the roller 10. Therefore, in the head-up state, during further translational movement of the carriage 20 such as for a space operation, no feeding of the thermo-ink ribbon 1 occurs.

In operation, in the head-down position, the thermal head 4 exerts a predetermined pressure against the thermo-ink ribbon 1 and the recording paper 7, as backed by the platen 6, in accordance with the force exerted by the coil spring (not shown) through the supporting lever 22. The actual printing is performed in accordance with the prior art process of transfer of the thermo-ink from the ribbon 1 to the recording paper 7. Following the print operation, the print carriage 20 is advanced by one pitch along the main guide bar 8 and the thermo-ink ribbon 1 is advanced simultaneously, being wound onto the take-up spool 2, and the mechanism thus is prepared for the next successive printing operation. If a space is to be provided at the next position in the print line, the mechanism switches the thermal head 4 to the head-up position, thus displacing the thermal head 4 from the thermo-ink ribbon 1 and the recording paper 7, as shown in FIG. 4(*b*); the cam 24 is rotated to displace the U-shaped bar 25 from the roller 10 and thus shaft 9 is not rotated for advancing the thermo-ink ribbon, as before noted. As a result, economies in the use of the expensive thermo-ink ribbon 1 are achieved, since it is not needlessly advanced when the next character position in the print line is a space.

Whereas the figures of the drawings discussed in the foregoing are schematic in nature to facilitate an understanding of the invention, the following FIGS. 5–9 provide a more detailed illustration of the actual structure of an embodiment of the invention, and wherein like reference numerals denote like parts.

Figure 5:
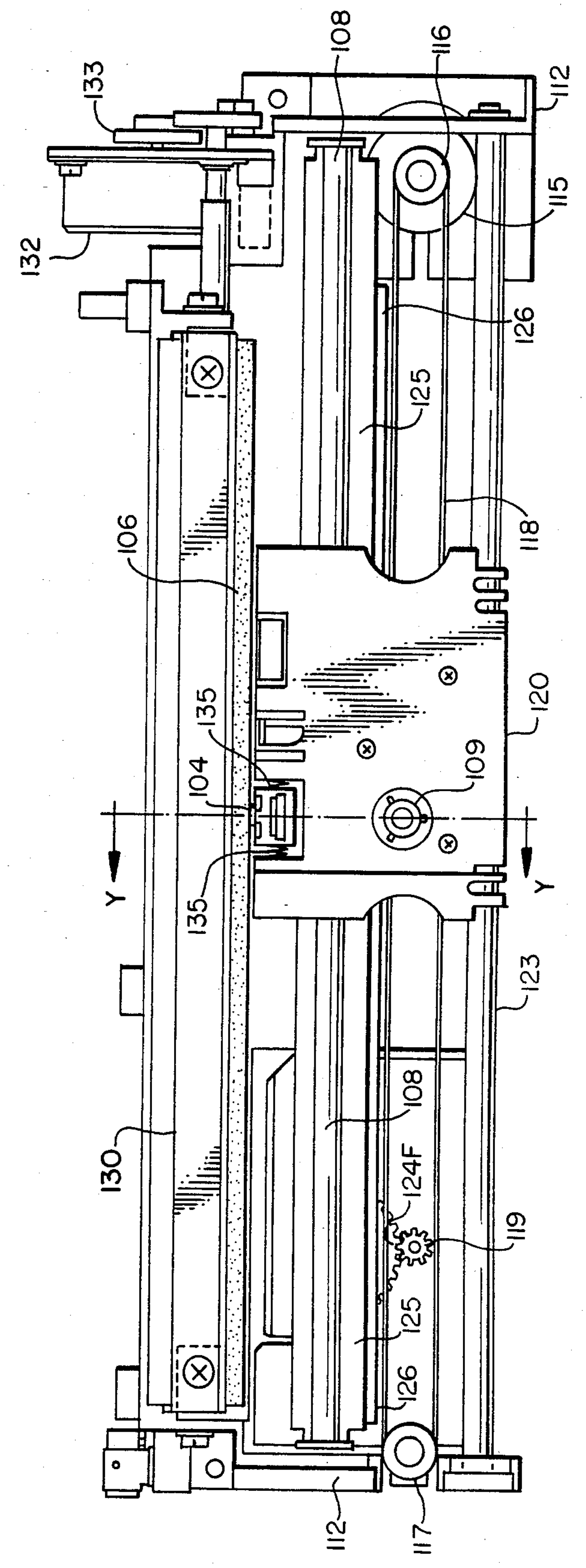
Figure 6A:
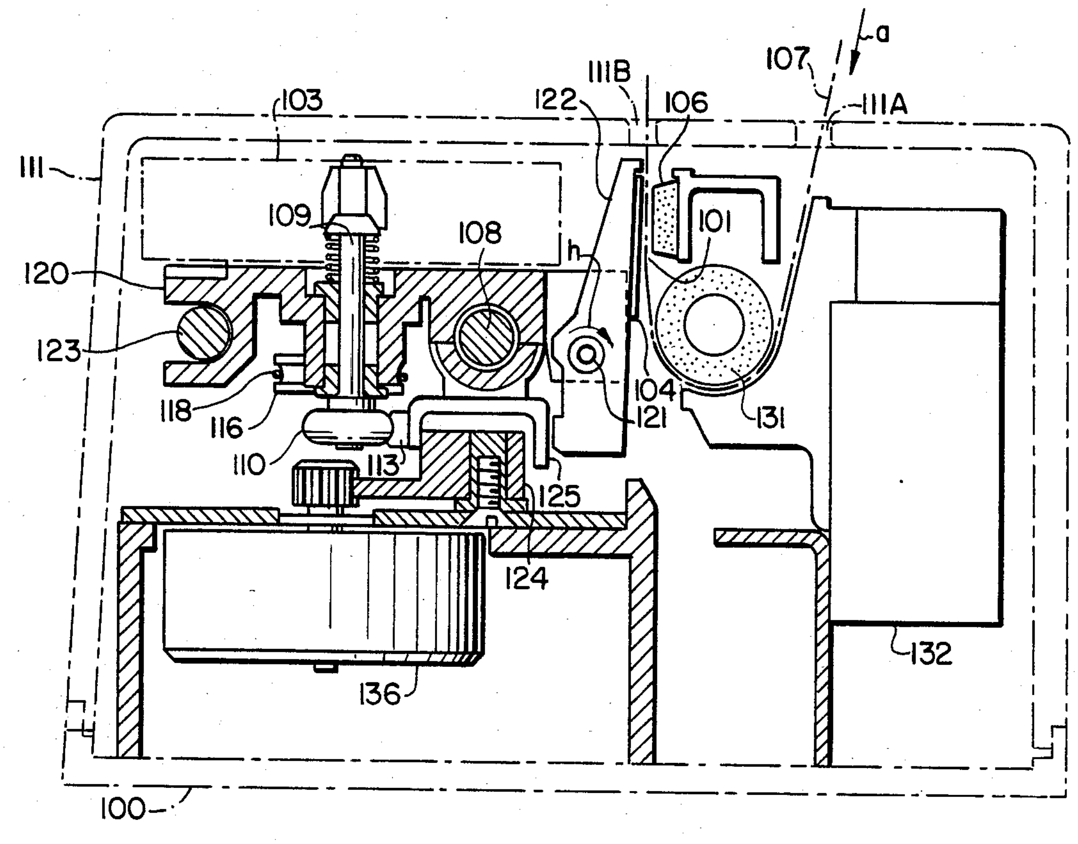
Figure 6B:
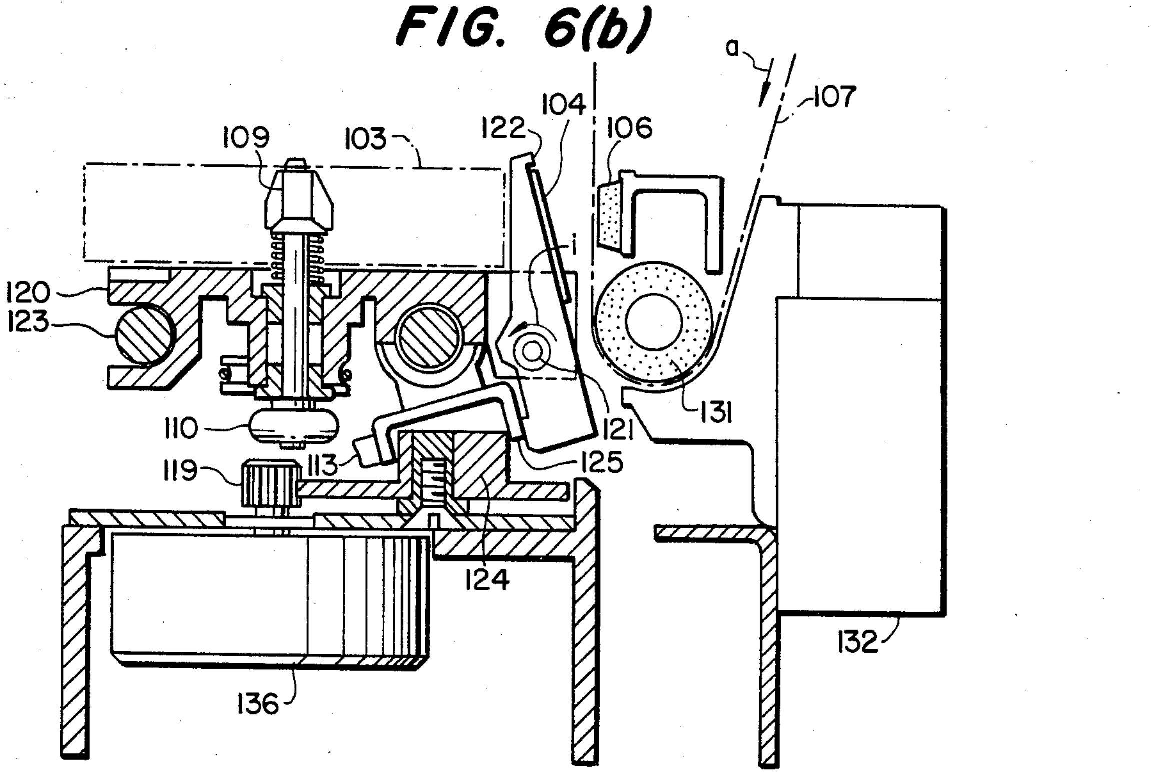

FIG. 5 is a plan view of an actual embodiment of the invention, illustrating the principal structure and components of a thermal printer, with the housing removed to better facilitate illustration of the internal components. FIGS. 6(*a*) and 6(*b*) are cross-sectional views of the thermal printer of FIG. 5 taken along the line Y—Y in FIG. 5 and respectively illustrate the mechanism in the head-down and head-up positions of the thermal head; FIGS. 6(*a*) and 6(*b*) are drawn on a larger scale than that of FIG. 5 for ease of illustration. Concurrent reference will be had to FIGS. 5, 6(*a*) and 6(*b*) in the following.

The printer is enclosed within a housing, shown by dash-dot lines in FIG. 6(*a*), comprising a base plate 100 and a cover 111, the latter having in its upper horizontal portion two slots 111A and 111B through which recording paper 107, shown by a dash-dot line, enters and exits the printing mechanism in the direction shown by the arrow a. The recording paper 107 is received about the feed roller 131 which in turn is driven by a paper feed motor 132 through reduction gears 133, and passes from the roller 131 in a path between a fixed platen 106 and a thermo-ink ribbon 101 (illustrated by a dotted line in FIG. 6(*a*)), the recording paper 107 exiting from the printer through the slot 111B in the cover 111. It will be appreciated that the cylindrical platen 6 of FIGS. 3 and 4 thus is replaced by the flat platen 106 and the feed roller 131. A main guide bar 108 and a clamping guide bar 123 are arranged in parallel axial relationship with each other and with the axes of the feed roller 131 and the platen 106, the guide bars 108 and 123 being secured rigidly to the frame 112. The printing carriage 120 is supported on the guide bars 108 and 123 for sliding movement therealong, and is driven by a carriage driving motor 115, pulleys 116 and 117, and a closed loop cable 118.

A supporting lever 122 is mounted pivotally on the printing carriage 120 by the pivot element 121 and is biased rotatably in the direction shown by arrow h by torsion coil springs 135 (see FIG. 5). A thermal head 104 is mounted on the upper, free end of the supporting lever 122 and disposed in facing relationship with the thermo-ink ribbon 101 and the recording paper 107. A thermo-ink ribbon cartridge 103 of conventional type (shown in dot-dash lines) is received on the thermal head carriage 120 such that the take-up reel is disposed over and thereby connected with the shaft 109, which serves to drive same. The shaft 109 is mounted rotatably within and extends downwardly from the printing carriage 120, and carries a roller 110 at its lower extremity. A U-shaped bar 125 is pivotally mounted on the main guide bar 108 and receives within its downwardly projecting elongaged recess, as before described, an eccentric cam 124 which, when rotated to the respective positions shown in FIGS. 6(*a*) and 6(*b*), causes the related mechanism including the U-shaped bar 125 and the support lever 122 to move the thermal print head 104 to the head-down and head-up positions, respectively. The mechanical switching operation of the structure shown in FIGS. 5, 6(*a*) and 6(*b*) is in accordance with that described previously in relation to FIGS. 3 and 4. The U-shaped bar 125 preferably carries a rubber plate 113 on the exterior of its sidewall which engages roller 110 to enhance the frictional engagement therebetween in the head-down position as seen in FIG. 6(*a*), thereby to assure that the ribbon advance function is performed reliably.

Figure 7:
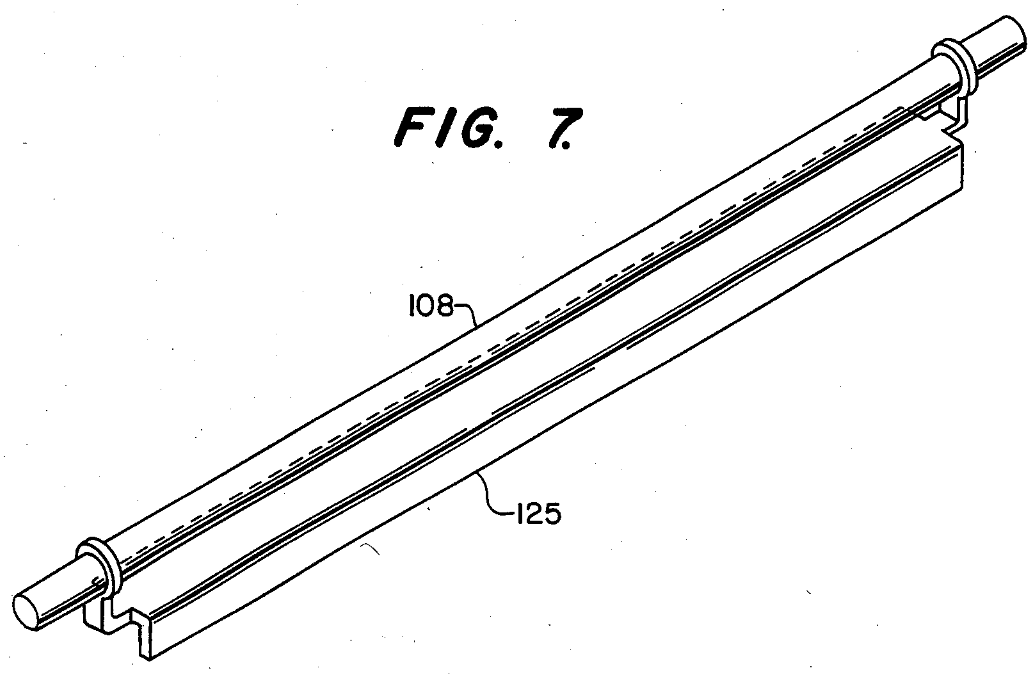

FIG. 7 is a perspective view illustrating in greater detail the U-shaped bar 125 and its pivotal mounting on the main guide bar 108. As distinguished from the structure of FIG. 4, in this embodiment the main guide bar 108 serves a dual purpose, both comprising the main guide for the carriage 120 and the pivotal support for the U-shaped bar 125.

Figure 8A:
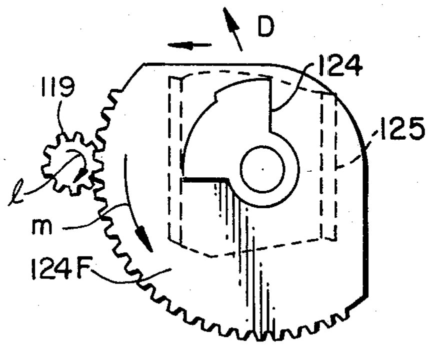
Figure 9A:
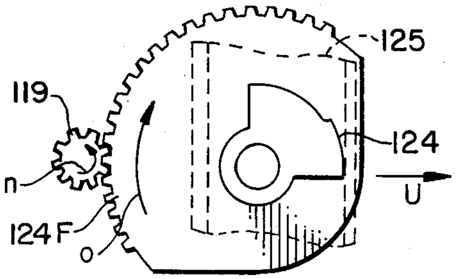
Figure 8B:
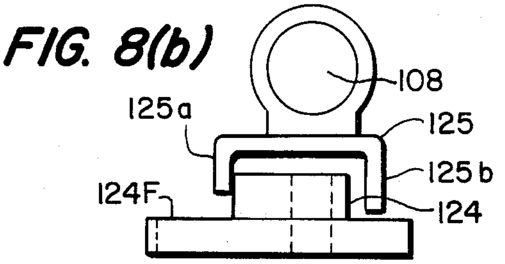
Figure 9B:
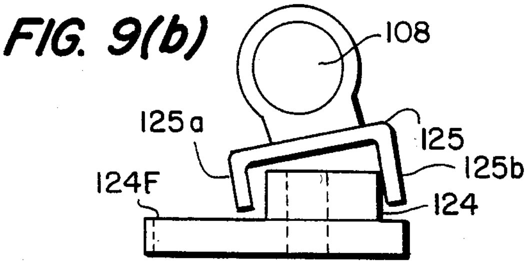

The illustrations of FIGS. 8 and 9 show the relative positions of the cam 124 and the cam follower action of the U-shaped bar 125 in the head-down and head-up states, respectively. More particularly, FIGS. 8(*a*) and 9(*a*) are plan views of the cam 124 and the driving mechanism therefor, whereas FIGS. 8(*b*) and 9(*b*) are simplified cross-sectional elevational views taken along a plane generally perpendicular to the U-shaped bar 125 and passing through the axis of the cam 124. The cam 124 comprises an integral, toothed gear segment 124F which extends radially beyond the cam surface and engages a gear 119 which is driven by the cam driving motor 136 seen in FIGS. 6(*a*) and 6(*b*). With reference to FIG. 8(*a*), when the motor 136 drives gear 119 in the direction of arrow 1, the cam 124 correspondingly is driven in the direction of arrow m, causing the eccentric cam 124 to bear against the interior surface of the sidewall 125*a* of the U-shaped bar 125, displacing same in the direction indicated by the arrow D for switching to the head-down position as illustrated in FIG. 6(*a*), in which the U-shaped bar 125 is displaced from the lower extremity of the supporting lever 122 for the thermal head 104. In that position, the thermal head 104 presses against the thermo-ink ribbon 101, the recording paper 107, and the stationary plate 106 in accordance with the resilient biasing of the torsion coil springs 135. Simultaneously, the U-shaped bar 125 operates through the rubber plate 113 to engage the roller 110 to produce the ribbon advance function during translational movement of the carriage 120. Conversely, as shown in FIGS. 9(*a*) and 9(*b*), when the gear 119 is driven in the direction of arrow n, the arcuate toothed segment 124F rotates the cam 124 in the direction of the arrow o, causing the eccentric cam 124 to engage the interior surface of the sidewall of the U-shaped bar, thereby pivoting the U-shaped bar 125 about the main support bar 108 and moving the sidewall 125*b* in the direction U. This corresponds to the head-up position of the mechanism shown in FIG. 6(*b*), in which the U-shaped bar 125 engages the supporting lever 122 to displace the thermal print head 104 from the thermo-ink ribbon 101, the recording paper 107, and the stationary platen 106, and in which the rubber plate 113 is displaced from the roller 110.

The significant reduction in the number, and in the total mass, of the elements of the head driving and ribbon feeding mechanism of the present invention which must move to perform the mechanical switching operations, as compared with that of the prior art, readily will be apparent. Very briefly, as described above, the prior art mechanism required movement of a substantial number of relatively large components, including the carriage, the ribbon cartridge and a long horizontal bar, to accomplish the mechanical switching actuation between head-up and head-down positions of the thermal printing head. By contrast, the mechanism of the invention requires movement only of a minimum number of components having a very small mass. Moreover, by proper selection of the pivot position of the supporting lever 122, taking into account the inertia and force factors relevant to its actuation, the required actuating force transferred through the U-shaped bar 125 to switch the support lever 122 between its head-up and head-down positions can be minimized. Moreover, the U-shaped bar 125 performs only a limited pivotal or rocking movement to accomplish the mechanical switching of the support lever 122, yet provides for simulaneous and coordinated engagement or disengagement of the ink ribbon feed function. As a result, the mechanism can operate rapidly to switch the thermal head between the head-up and head-down positions, thereby permitting high speed printing operations. Furthermore, the mechanical cam action employed by the present invention to afford the mechanical switching operation is substantially silent and thus overcomes the noise problems of the switching mechanisms of the prior art thermal printers.

Numerous modifications and adaptations of the head driving and ink ribbon feeding mechanism of the invention will be apparent to those of skill in the art, and thus it is intended by the appended claims to cover all such modifications and adaptations which fall within the true spirit and scope and the appended claims.

We claim:

1. A head-driving and ink ribbon feeding mechanism for an ink-transfer thermal printer having an elongated platen over which recording paper is advanced for receiving plural, thermal ink-transfer print images thereon in each of desired, successive line positions, comprising:

a print carriage;

means for mounting said print carriage to permit selective, translational movement thereof in a parallel axial direction relative to said platen and to prevent rotation thereof about said axial direction, said print carriage comprising a frame, support means pivotally mounted on said carriage frame and supporting adjacent a free end thereof a thermal print head disposed toward said platen, means for resiliently biasing said pivotal support means normally to urge said thermal head toward said platen in a head-down position, said frame being adapted for receiving a thermo-ink ribbon cartridge having therein a thermo-ink ribbon and supply and take-up spools therefore, so as to dispose a length of said thermo-ink ribbon extending between said spools intermediate said print head and said elongated platen, and a shaft rotatably mounted on said frame for drivingly engaging the take-up reel of the thermo-ink ribbon cartridge received on said frame, and mechanical actuating means selectively switchable between a first position engaging said shaft for rotating same during said translational movement of said print carriage, and thereby driving said take-up spool to advance said thermo-ink ribbon past said thermal print head when in the head-down position and a second position displaced from said shaft and engaging said pivotal support means for said thermal head for switching same, against said urging said resilient biasing means, to a head-up position in which said thermal head is displaced from said thermo-ink ribbon.

2. A head-driving and ink ribbon feeding mechanism as recited in claim 1, wherein said mechanical switching means comprises:

an elongated cam follower supported in fixed, parallel axial relationship with said carriage mounting means and for pivotal movement relative to the said axis thereof, and said print carriage further comprises an eccentric cam selectively moveable between first and second positions for actuating said cam follower between corresponding first and second positions, said cam follower in its first said position engaging said shaft for driving same in rotation during movement of said carriage and, in its second position, being displaced from said shaft and engaging said pivotal support lever for pivoting same and switching said thermal head to said head-up position.

3. A head-driving and a ribbon feeding mechanism as recited in claim 1, wherein:

said shaft extends from said print carriage frame in a direction substantially perpendicular to said elongated cam follower and supports a drive roller adjacent the free end thereof, and high friction material is provided on the surface of said elongated cam follower which engages said shaft.

4. A head-driving and ink ribbon feeding mechanism as recited in claim 2, wherein:

said elongated cam follower has an inverted, U-shaped cross-section, the sidewalls thereof defining an elongated recess, and said eccentric cam is received within said recess of said cam follower and selectively engages the interior surfaces of said sidewalls in the respective first and second positions of said cam.

5. A head-driving and ink ribbon feeding mechanism as recited in claim 4, wherein said eccentric cam is rotatably mounted on said frame of said print carriage and is moveable through selective rotation to said first and second positions.

6. A head-driving and ink ribbon feeding mechanism as recited in claim 1, wherein said resilient biasing means comprise coil-shaped torsion springs.

7. A head-driving and ink ribbon feeding mechanism as recited in claim 1, wherein said pivotal support means for supporting said thermal print head comprises an elongated element pivotally mounted at a position intermediate the length thereof to said carriage frame, and said thermal print head is supported thereon adjacent a first free end of said elongated element, and said mechanical actuating means, in said second position thereof, engages the opposite, free end of said elongated element.

* * * * *

UNITED STATES PATENT AND TRADEMARK OFFICE
CERTIFICATE OF CORRECTION

PATENT NO. : 4,563,692

DATED : January 7, 1986

INVENTOR(S) : Moriyasu Negita et al.

It is certified that error appears in the above-identified patent and that said Letters Patent is hereby corrected as shown below:

Col. 2, line 43, "direction" should be --directions--.

Col. 3, line 21, "rotaty" should be --rotary--.

Col. 9, line 13, "elongaged" should be --elongated--.

Col. 11, line 18, after "urging" insert --of--.

Signed and Sealed this

*Thirteenth* Day of *May 1986*

[SEAL]

*Attest:*

DONALD J. QUIGG

*Attesting Officer*

*Commissioner of Patents and Trademarks*